US010006188B2

(12) United States Patent
Fukuda et al.

(10) Patent No.: US 10,006,188 B2
(45) Date of Patent: Jun. 26, 2018

(54) WORK MACHINE

(71) Applicant: KUBOTA CORPORATION, Osaka-shi (JP)

(72) Inventors: Yuji Fukuda, Sakai (JP); Hiroaki Nakagawa, Sakai (JP); Kazuyoshi Arii, Sakai (JP); Ryosuke Kinugawa, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 241 days.

(21) Appl. No.: 15/193,109

(22) Filed: Jun. 27, 2016

(65) Prior Publication Data

US 2016/0305093 A1 Oct. 20, 2016

Related U.S. Application Data

(63) Continuation of application No. PCT/JP2015/053419, filed on Feb. 6, 2015.

(30) Foreign Application Priority Data

Mar. 31, 2014 (JP) .................................. 2014-073139

(51) Int. Cl.
*F16D 31/02* (2006.01)
*E02F 9/22* (2006.01)
(Continued)

(52) U.S. Cl.
CPC ............ *E02F 9/2228* (2013.01); *B60T 11/21* (2013.01); *B60T 11/28* (2013.01); *B60T 13/662* (2013.01);
(Continued)

(58) Field of Classification Search
CPC ... F15B 21/042; F15B 21/045; F16H 61/4052
(Continued)

(56) References Cited

U.S. PATENT DOCUMENTS 4,570,849 A * 2/1986 Klaucke .................. F01P 7/044
165/284
4,798,050 A * 1/1989 Nakamura ............... B62D 5/07
60/468
(Continued)

FOREIGN PATENT DOCUMENTS

JP 58-175206 U1 11/1983
JP 10-212952 8/1998
(Continued)

OTHER PUBLICATIONS

International Search Report for corresponding International Application No. PCT/JP2015/053419, dated Apr. 21, 2015.

*Primary Examiner* — Michael Leslie
(74) *Attorney, Agent, or Firm* — Mori & Ward, LLP

(57) ABSTRACT

A hydraulic motor has a primary side and a secondary side. A hydraulic pump is to be driven by the engine to supply an operation fluid to the primary side. A bypass circuit is to connect the primary side and the secondary side. An electromagnetic valve is configured to control a flowing amount of the operation fluid in the bypass circuit to control an amount of the operation fluid supplied to the primary side. A filter is disposed in a fluid tube connected to the secondary side. A relief valve is disposed between the hydraulic pump and the primary side. A controller is to control the electromagnetic valve to drive the hydraulic motor in a case where a temperature of the operation fluid is low when the engine is started.

9 Claims, 7 Drawing Sheets

(51) Int. Cl.
*F16H 61/4052* (2010.01)
*F15B 21/04* (2006.01)
*B60T 11/28* (2006.01)
*E02F 9/08* (2006.01)
*E02F 9/26* (2006.01)
*F15B 15/02* (2006.01)
*F15B 18/00* (2006.01)
*B60T 11/21* (2006.01)
*B60T 13/66* (2006.01)
*B60T 17/22* (2006.01)
*F15B 20/00* (2006.01)
*E02F 3/34* (2006.01)

(52) U.S. Cl.
CPC ............ *B60T 17/22* (2013.01); *E02F 9/0866* (2013.01); *E02F 9/226* (2013.01); *E02F 9/2232* (2013.01); *E02F 9/2271* (2013.01); *E02F 9/2282* (2013.01); *E02F 9/2285* (2013.01); *E02F 9/26* (2013.01); *F15B 15/02* (2013.01); *F15B 18/00* (2013.01); *F15B 20/002* (2013.01); *F15B 21/04* (2013.01); *F15B 21/042* (2013.01); *F16H 61/4052* (2013.01); *E02F 3/3414* (2013.01); *F15B 20/007* (2013.01); *F15B 2211/20576* (2013.01); *F15B 2211/50518* (2013.01); *F15B 2211/611* (2013.01); *F15B 2211/615* (2013.01); *F15B 2211/62* (2013.01); *F15B 2211/6343* (2013.01); *F15B 2211/6346* (2013.01); *F15B 2211/6355* (2013.01); *F15B 2211/7058* (2013.01); *F15B 2211/75* (2013.01); *F15B 2211/853* (2013.01)

(58) Field of Classification Search
USPC .................................................. 60/456, 468
See application file for complete search history.

(56) References Cited

U.S. PATENT DOCUMENTS 5,946,911 A     9/1999   Buschur et al.
6,845,614 B2 *  1/2005   Stahlman .............. F15B 21/042
                                                    60/456

FOREIGN PATENT DOCUMENTS

JP      2000-213347      8/2000
JP      4312681  B2      3/2006

* cited by examiner

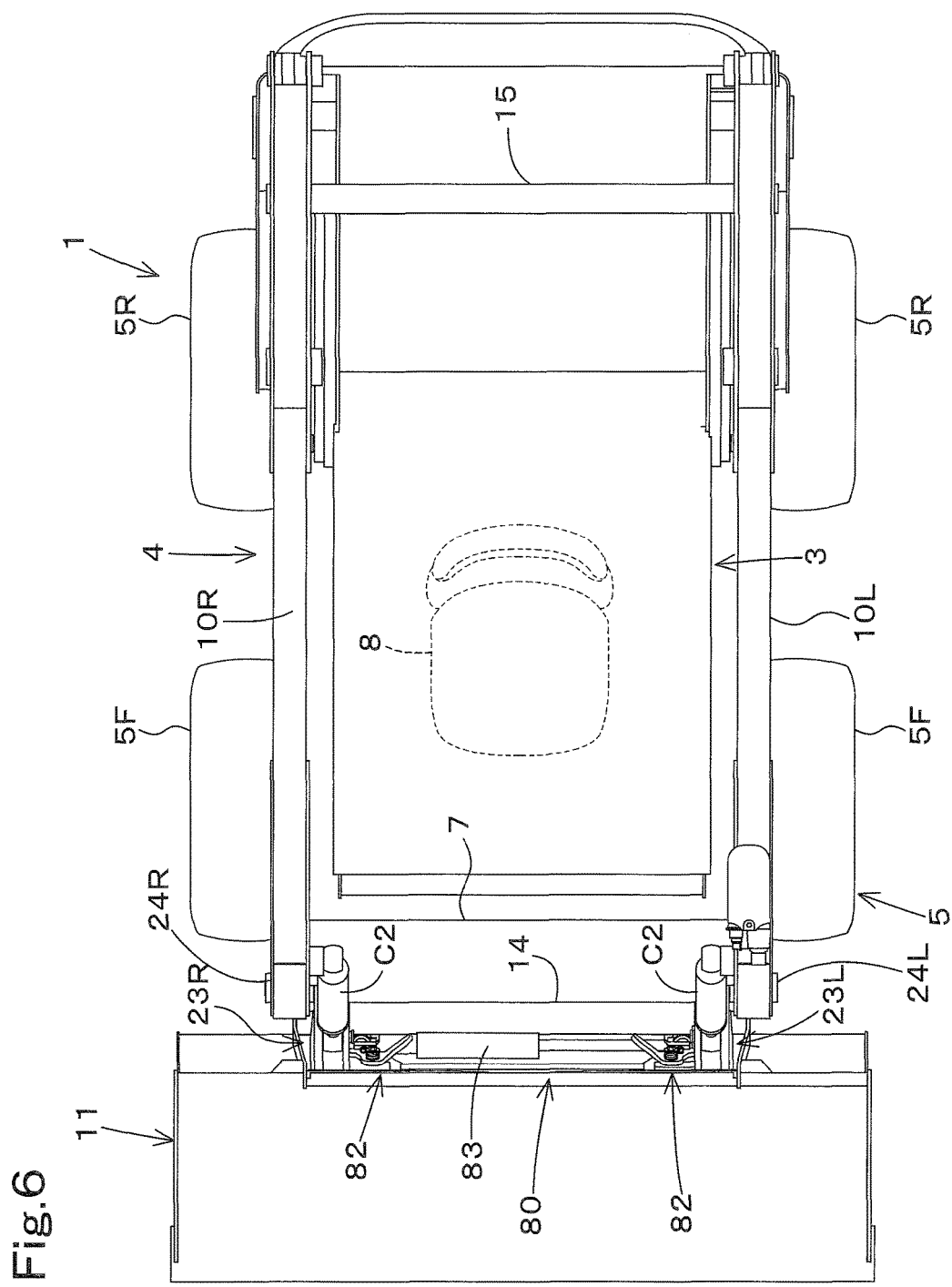

WORK MACHINE

CROSS-REFERENCE TO RELATED APPLICATIONS

The present application is a continuation application of International Application No. PCT/JP2015/053419, filed Feb. 6, 2015, which claims propriety to Japanese Patent Application No. 2014-073139, filed Mar. 31, 2014. The contents of these applications are incorporated herein by reference in their entirety.

BACKGROUND OF THE INVENTION

Field of the Invention

The present invention relates to a work machine.

Discussion of the Background

Japanese Patent Publication No. 4312681 discloses a cooling device for construction machines as a control system for controlling a flow of an operation fluid in a hydraulic circuit relating to a work machine.

SUMMARY OF THE INVENTION

According to one aspect of the present invention, a work machine includes an engine, a hydraulic motor, a cooling fan, a hydraulic pump, a bypass circuit, an electromagnetic valve, a filter, a relief valve, and a controller. The hydraulic motor has a primary side and a secondary side. The cooling fan is to be revolved by the hydraulic motor. The hydraulic pump is to be driven by the engine to supply an operation fluid to the primary side of the hydraulic motor. The bypass circuit connects the primary side and the secondary side of the hydraulic motor. The electromagnetic valve is disposed in the bypass circuit. The electromagnetic valve is configured to control a flowing amount of the operation fluid in the bypass circuit to control an amount of the operation fluid supplied to the primary side of the hydraulic motor. The filter is disposed in a fluid tube connected to the secondary side of the hydraulic motor. The relief valve is disposed between the hydraulic pump and the primary side of the hydraulic motor. The controller is to control the electromagnetic valve to drive the hydraulic motor in a case where a temperature of the operation fluid is low when the engine is started.

According to another aspect of the present invention, a work machine includes an engine, a hydraulic motor, a cooling fan, a hydraulic pump, a bypass circuit, an electromagnetic valve, a first fluid tube, a second fluid tube, a hydraulic actuator, a control valve, and a controller. The hydraulic motor has a primary side and a secondary side. The cooling fan is to be revolved by the hydraulic motor. The hydraulic pump is to be driven by the engine to supply an operation fluid to the primary side of the hydraulic motor. The bypass circuit is to connect the primary side and the secondary side of the hydraulic motor. The electromagnetic valve is disposed in the bypass circuit. The electromagnetic valve is configured to control a flowing amount of the operation fluid in the bypass circuit to control an amount of the operation fluid supplied to the primary side of the hydraulic motor. The first fluid tube is to connect the primary side of the hydraulic motor and the hydraulic pump. The second fluid tube is branched from the first fluid tube. The hydraulic actuator is to receive the operation fluid from the second fluid tube. The control valve is connected to the second fluid tube to supply the operation fluid to the hydraulic actuator. The controller is to control the electromagnetic valve to increase a revolution speed of the hydraulic motor when the hydraulic actuator is in operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a plan view of a front portion of a skid steer loader according to the embodiments of the present invention.

DESCRIPTION OF THE EMBODIMENTS

Embodiments of the present invention will be explained below. An identical numeral and an identical name are given an identical component shared with the embodiments described below. Components given an identical numeral and an identical name, accordingly, are not explained repeatedly.

First Embodiment

Referring to drawings, a first embodiment of the present invention will be explained.

Figure 7:
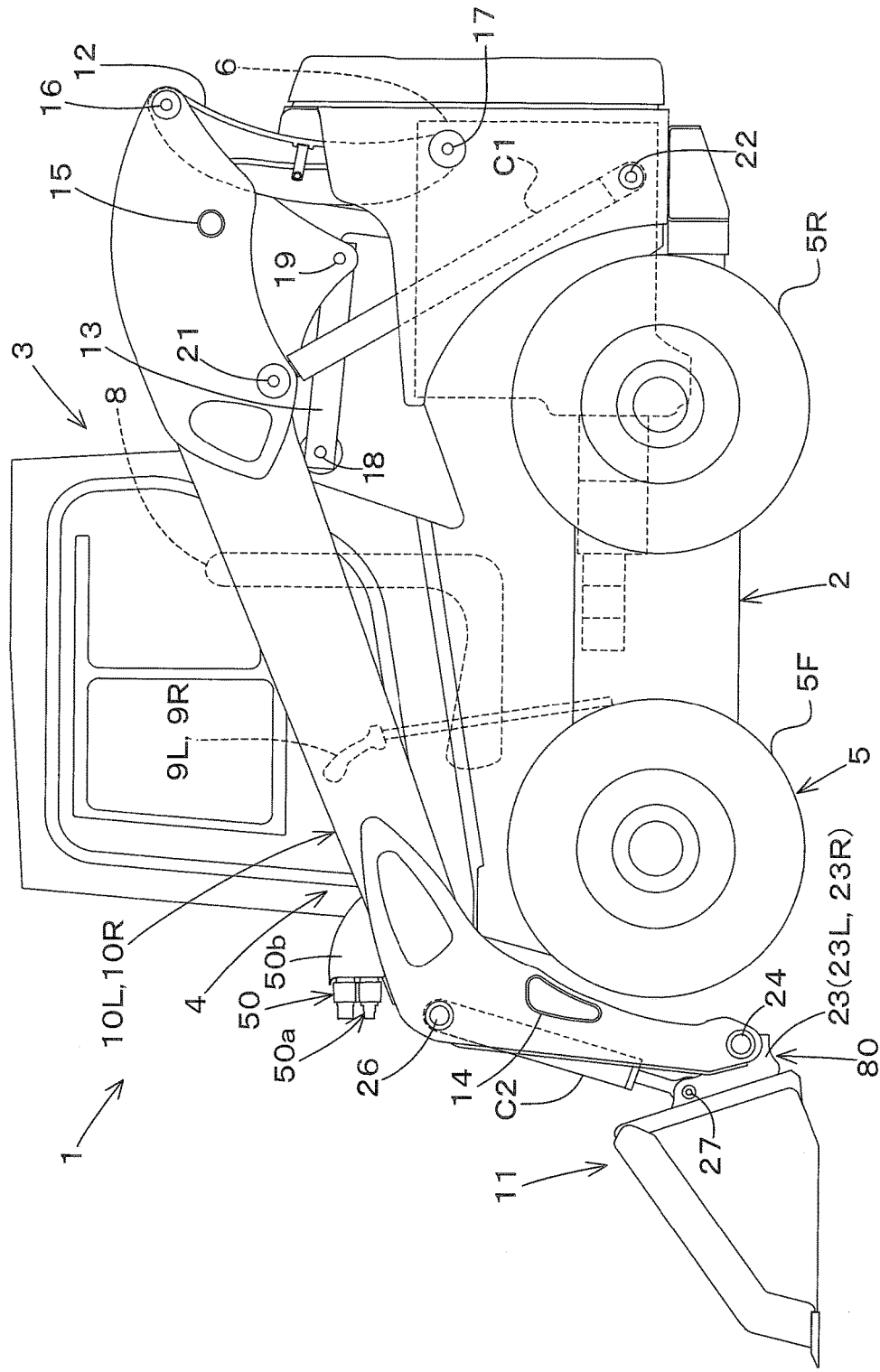
FIG. 7 is an overall view of the skid steer loader exemplified as a work machine according to the embodiments of the present invention.

FIG. 7 is an overall view of a skid steer loader 1 exemplified as a work machine.

Hereinafter, in the following description, a laterally-outward direction corresponds to a direction from a center portion of the skid steer loader 1 toward a side portion of the skid steer loader 1 in a lateral direction with respect to a travel direction of the skid steer loader 1. A laterally-inward direction corresponds to a direction from the side portion of the skid steer loader 1 toward the center portion of the skid steer loader 1 in the lateral direction. In other words, the lateral direction is a direction perpendicular to the travel direction (a rear to front direction), and thus can be referred to as a width direction. In this manner, the laterally-outward direction is referred to as an outward width direction, and the laterally-inward direction is referred to as an inward width direction.

In FIG. 7, the skid steer loader 1 includes a machine frame 2, a cabin 3, an operation device 4, and travel devices 5. The cabin 3 is mounted on the machine frame 2. The operation device 4 is attached on the machine frame 2. The skid steer loader 1 includes two travel devices 5. One of the travel devices 5 is provided on a right side of the machine frame 2, and the other one is provided on a left side of the machine frame 2.

An engine 6 is mounted on a rear portion in the machine frame 2. A operator seat 8 is disposed on a rear portion in the cabin 3. A travel lever 9L is disposed on a left side of and in front of the operator seat 8, the travel lever 9L being used for an operation of the travel device 5. A travel lever 9R is disposed on a right side of and in front of the operator seat 8, the travel lever 9L being used for an operation of the travel device 5. The travel lever 9L disposed on the left side is a member for an operation of the travel device 5 disposed on the left side, and the travel lever 9R disposed on the right side is a member for an operation of the travel device 5 disposed on the right side. An operation member 25 is disposed in the cabin 3, the operation member 25 being used for an operation of an auxiliary actuator 33 described later (see FIG. 1).

The operation device 4 includes a boom 10L, a boom 10R, a bucket (an operation tool) 11, a lift link 12, a control link 13, a boom cylinder C1, and a bucket cylinder C2. The boom 10L is disposed on a left side of the cabin 3 and of the machine frame 2, and the boom 10R is disposed on a right side of the cabin 3 and of the machine frame 2. The bucket (the operation tool)11 is disposed on tip portions (front end portions) of the boom 10L disposed on the left side and the boom 10R disposed on the right side and is capable of being freely swung upward and downward. The lift link 12 and the control link 13 support base portion sides (rear portion sides) of the booms 10L and 10R. The boom cylinder C1 is a cylinder for moving the booms 10L and 10R upward and downward. The boom cylinder C2 is a cylinder C2 for moving the bucket 11 upward and downward. The boom cylinder C1 and the bucket cylinder C1 are each constituted of a double action type hydraulic cylinder.

The tip portions of the booms 10L and 10R are coupled to each other by a front coupling member 14, the front coupling member 14 being constituted of a deformed pipe. The base portions of the booms 10L and 10R are coupled to each other by a rear coupling member 15, the rear coupling member 15 being constituted of a cylindrical pipe. The lift link 12, the control link 13 and the boom cylinder C1 are disposed, corresponding to the booms 10L and 10R, on each of the left side and the right side of the machine frame 2. Thus, the operation device 4 includes two lift links 12, two control links 13, and two boom cylinders 14. The lift links 12 are disposed being vertically arranged on rear end sides of the booms 10L and 10R (on a portion locating on a rear end side of the machine frame 2 in the outward width direction). Each of the lift links 12 is supported at an upper portion of the lift link 12 by a pivot shaft 16 (referred to as a first pivot shaft) to be capable of freely turning around a lateral axis (a horizontal axis) of the pivot shaft 16, the lift links 12 being supported on the rear end sides of the base portions of the booms 10L and 10R by the pivot shaft 16. In addition, each of the lift links 12 is supported at a lower portion of the lift link 12 by a pivot shaft 17 (referred to as a second pivot shaft) to be capable of freely turning around a horizontal axis of the pivot shaft 17, the lift links 12 being supported on an upper portion of a rear end side of the machine frame 2 by the pivot shaft 17.

The control link 13 is disposed being arranged along the rear to front direction in front of the lift link 12. A front end side of the control link 13 is supported on the machine frame 2 by a pivot shaft 18 (a third pivot shaft) to be capable of freely turning around a horizontal axis of the pivot shaft 20.

A rear end side of the control link 13 is supported by a pivot shaft 19 (a fourth pivot shaft) to be capable of freely turning around a horizontal axis of the pivot shaft 19, the rear end side being supported on a lower end side in an intermediate portion of each of the base portion sides of the booms 10L and 10R in the rear to front direction.

The boom cylinder C1 is supported at an upper portion of the boom cylinder 14 by a first boom cylinder pin 21 to be capable of freely turning around a horizontal axis of the pivot shaft 18, the upper portion being supported on a front portion of each of the base portion sides of the booms 10L and 10R. The boom cylinder C1 is supported at a lower portion of the boom cylinder C1 by a second boom cylinder pin 21 to be capable of freely turning around a horizontal axis of the second boom cylinder pin 21, the lower portion being supported on a lower portion of a rear end side of the machine frame 2. Stretching and shortening of the boom cylinder C1 swing the booms 10L and 10R upward and downward around the first pivot shafts 16, the booms 10L and 10R being supported on the base portion sides of the booms 10L and 10R by the lift link 12 and the control link 13, thereby moving tip portion sides of the booms 10L and 10R (the bucket 11) upward and downward. The control link 13 is swung upward and downward around the third pivot shaft 18 by the swinging upward and downward of the booms 10L and 10R. The lift link 12 is swung forward and backward around the second pivot shaft 17 by the swinging upward and downward of the control link 13.

The bucket 11 is attached to the attachment body 23 and is capable of being freely attached and detached, the attachment body 23 being pivotally supported on the tip end sides (the front end sides) of the booms 10L and 10R. The attachment body 23 is supported on the tip end sides of the booms 10L and 10R by a pivot pin 24, thereby being capable of freely turning about a horizontal axis of the pivot pin 24. Not only the bucket 11, other operation tools can be attached to the attachment body 23. The following attachments (spare attachments) are exemplified as the other operation tools, for example, a hydraulic crusher, a hydraulic breaker, an angle broom, an earth auger, a pallet fork, a sweeper, a mower, a snow blower, and the like.

The bucket cylinders C2 are arranged on the tip end sides of the booms 10L and 10R, the bucket cylinders C2 being arranged locating in the inward width direction. The bucket cylinders C2 are pivotally supported on the booms 10L and 10R by a first bucket cylinder pin 26 at the upper portions of the bucket cylinders C2, thereby being capable of freely turning about a horizontal axis of the first bucket cylinder pin 26. The bucket cylinders C2 are pivotally supported on the attachment body 23 by a second bucket cylinder pin 27 at the lower portions of the bucket cylinders C2, thereby being capable of freely turning about a horizontal axis of the second bucket cylinder pin 27. Stretching and shortening of the bucket cylinder C2 swing the bucket 11.

In the embodiment, both of the travel device 5 disposed on the right side and the travel device 5 disposed on the left side employ a wheeled travel device, the wheeled travel device having a front wheel 5F and a rear wheel 5R. A crawler travel device (including a semi-crawler travel device), however, may be employed as the travel device 5.

Then, a hydraulic circuit H1 will be explained, the hydraulic circuit H1 being disposed on the skid steer loader 1 having the configuration described above.

Figure 1:
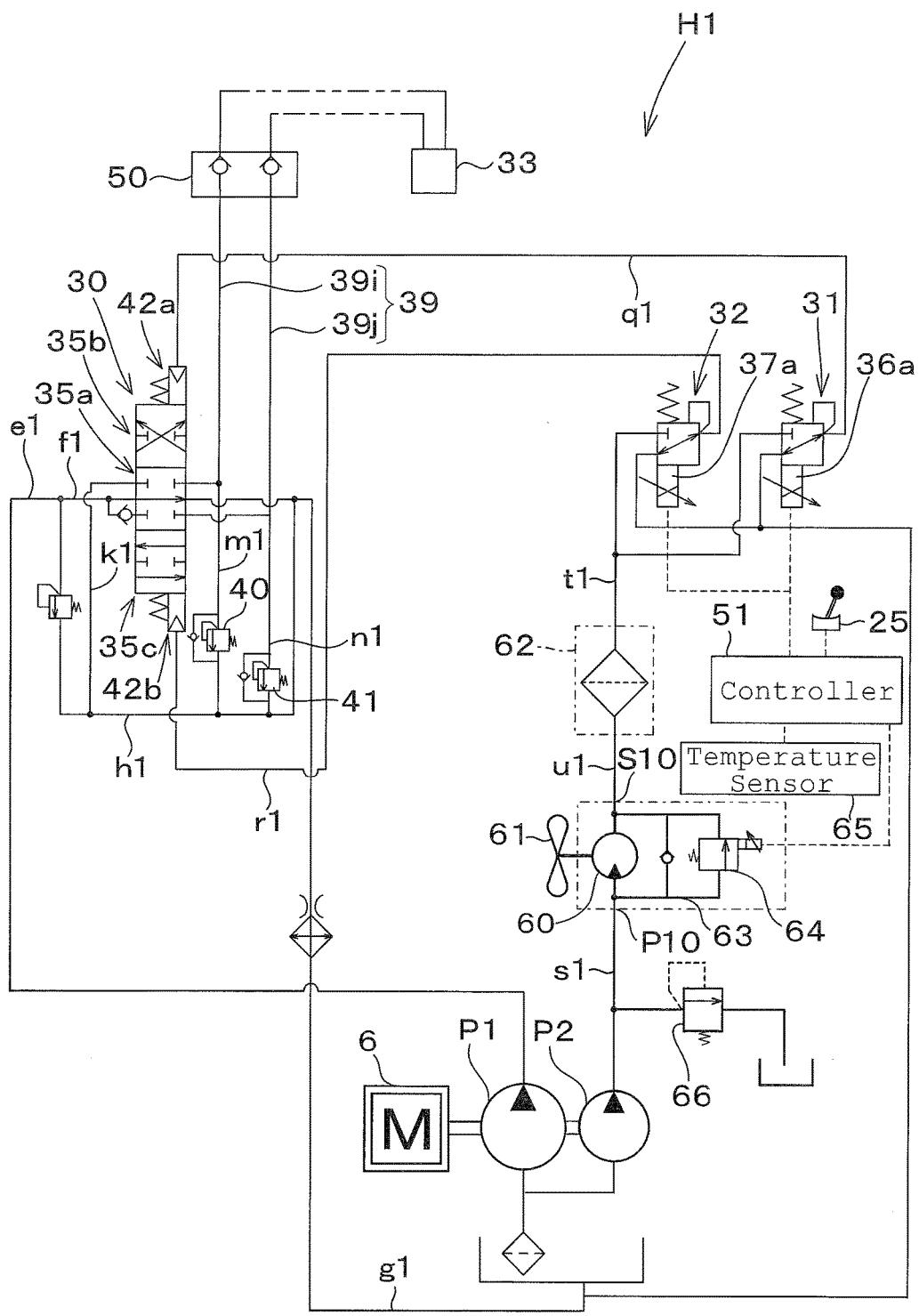
FIG. 1 is a view exemplifying a hydraulic circuit of a work machine according to a first embodiment of the present invention.

FIG. 1 is a view exemplifying the hydraulic circuit 141 of the work machine according to the embodiment. In addition, FIG. 1 shows the hydraulic circuit H1 for operation an auxiliary attachment of the skid steer loader 1.

An overall configuration of the hydraulic circuit H1 will be explained firstly.

As shown in FIG. 1, the hydraulic circuit H1 includes a first pump P1, a second pump P2, an auxiliary control valve (referred to as an SP control valve) 30, and auxiliary electromagnetic valves (referred to as SP electromagnetic valves) 31 and 32. The SP electromagnetic valves 31 and 32 are a pair of electromagnetic valves used for operation the SP control valve 30.

The first pump P1 is a hydraulic pump, and specifically is a gear pump of a constant displacement type, the gear pump being driven by a motive power of the engine 6. The first pump P1 is used for driving the hydraulic actuator 33 of the auxiliary attachment attached instead of the bucket 11. For convenience in the following explanation, the hydraulic actuator 33 of the auxiliary attachment is referred to as an auxiliary actuator.

The SP control valve 30 is a three-position switch valve of a direct operated spool type, the three-position switch valve being operated by a pilot pressure. The SP control valve 30 is configured to be freely switched to three positions of a neutral position 35a, a first position 35b and a second position 35c by the pilot pressure. The SP control valve 30, meanwhile, is returned to the neutral position 35a by a spring.

An operational supply fluid tube f1 is connected to the SP control valve 30, the operational supply fluid tube f1 communicating with a discharge tube e1 of the first pump P1. In addition, a bypass fluid tube h1 is connected to the SP control valve 30 through a discharge fluid tube k1, and a drain fluid tube g1 also is connected to the SP control valve 30, the drain fluid tube g1 returning to a side of a tank.

In addition, an operation fluid supply tube 39 is connected between the SP control valve 30 and a connection device 50. The operation fluid supply tube 39 is constituted of two tubes. One of the tubes, a tube 39i, is connected to a bypass fluid tube h1 through a first relief tube m1, and the other of the tubes, a tube 39j, is connected to the bypass fluid tube h1 through a second relief tube n1. The relief valve 40 and the relief valve 41 are disposed on the first relief tube m1 and the second relief tube n1 respectively.

The connection device 50 connects the SP control valve 30 and the auxiliary actuator 33 to each other, and specifically connects the SP control valve 30 and the auxiliary actuator 33 to each other through the operation fluid supply tube 39, a hydraulic hose and the like. As shown in FIG. 1 and FIG. 7, the connection device 50 is specifically constituted of a hydraulic coupler 50a and a support member (an attachment stay) 50b, the hydraulic coupler 50a being disposed on a front side of the boom 10L, the support member 50b supporting the hydraulic coupler 50a on the boom 10L.

The SP electromagnetic valve 31, one of the pair of the SP electromagnetic valves 31 and 32, is connected to a pressure reception part 42a disposed on one side of the SP control valve 30 through the first pilot fluid tube q1. The SP electromagnetic valve 32, one of the pair of the SP electromagnetic valves 31 and 32, is connected to a pressure reception part 42b disposed on the other side of the SP control valve 30 through the second pilot fluid tube r1. A pilot fluid (a pressure fluid) can be supplied from the second pump P2 to the SP electromagnetic valves 31 and 32 through a pilot pressure supply fluid tube t1.

In this manner, when the SP control valve 30 is switched to the first position 35b by the SP electromagnetic valve 31, the operation fluid is supplied from the tube 39i, one of the tubes 39i and 39j, to the auxiliary actuator 33, the operation fluid being discharged from the first pump P1, and the operation fluid returning from the auxiliary actuator 33 flows from the tube 39j, the other one of the tubes 39i and 39j, to the discharge fluid tube k1.

In addition, when the SP control valve 30 is switched to the second position 35c by the SP electromagnetic valve 32, the operation fluid is supplied from the tube 39j, the other one of the tubes 39i and 39j, to the auxiliary actuator 33, the operation fluid being discharged from the first pump P1, and the operation fluid returning from the auxiliary actuator 33 flows from the tube 39i, one of the tubes 39i and 39j, to the discharge fluid tube k1.

The hydraulic circuit H1 is capable of operating the auxiliary actuator 33 of the auxiliary attachment through the SP control valve 30 by actuating the SP electromagnetic valves 31 and 32.

A control device (a controller) 51 controls the SP electromagnetic valves 31 and 32, the control device 51 being mounted on the skid steer loader 1 that is a work machine. The control device 51 carries out the operations of the SP electromagnetic valves 31 and 32 (the SP control valves 30) in accordance with switches and the like disposed on the operation member 25.

Then, in the hydraulic circuit H1 described above, a hydraulic motor 60 is disposed between the second pump P2 and the pilot pressure supply fluid tube t1, the pilot pressure supply fluid tube t1 being used for supplying the pilot fluid (the pressure fluid) to the SP electromagnetic valves 31 and 32. A cooling fan 61 is disposed on a revolution shaft of the hydraulic motor 60. The hydraulic motor 60, specifically, is disposed on a downstream side being downward further than the second pump P2 along a flow of the operation fluid discharged from the second pump P2. A port P10 is connected to the second pump P2 by a fluid tube s1 (also referred to as a first fluid tube), the port P10 being disposed on a primary side of the hydraulic motor 60 and serving as a flow inlet for the operation fluid, and thus the operation fluid is supplied from the second pump P2 to the hydraulic motor 60. A port S10 is connected to a fluid tube u1, the port S10 being disposed on a secondary side of the hydraulic motor 60 and serving as a discharge outlet for the operation fluid, and thus a filter 62 is connected to the fluid tube u1, the filter 62 filtering the operation fluid. The fluid tube u1 is connected to an upstream side being upward further than the filter 62, and the pilot pressure supply fluid tube t1 is connected to the downstream side. In this manner, the operation fluid passes through the hydraulic motor 60 and then is discharged from the port S10 disposed on the secondary side, and then the operation fluid is filtered by the filter 62 and then is supplied to the pilot pressure supply fluid tube t1.

A bypass circuit 63 is disposed on the hydraulic circuit H1. The bypass circuit 63 is a hydraulic tube connecting a downstream side being slightly downward than the port P10 and an upstream side being slightly upward than the port S10 to each other, the port P10 being disposed on the primary side of the hydraulic motor 60, the port S10 being disposed on the secondary side. The operation fluid supplied from the second pump P2 can be prevented from flowing to the hydraulic motor 60 when the operation fluid flows in the bypass circuit 63.

An electromagnetic valve 64 is disposed on an intermediate portion of a hydraulic tube of the bypass circuit 63, the electromagnetic valve 64 having, for example, a solenoid to change (control) a flow rate of the operation fluid. When the electromagnetic valve 64 is fully closed, the operation fluid supplied from the second pump P2 entirely flows into the hydraulic motor 60 without flowing into the bypass circuit 63, and thus the hydraulic motor 60 revolves at the maximum revolution speed in accordance with a pressure difference between the primary side and the secondary side. In addition, when the electromagnetic valve 64 is fully opened, the operation fluid supplied from the second pump P2 entirely flows into the bypass circuit 63 without flowing into the hydraulic motor 60, and thus the hydraulic motor 60 does not revolve.

Thus, the flow rate of the operation fluid flowing into the hydraulic motor 60 is changed by changing a valve aperture of the electromagnetic valve 64 between the fully-closing and the fully-opening, and thus a revolution speed of the hydraulic motor 60 can be changed. Meanwhile, in view of the fail-safe, the electromagnetic valve 64 is fully closed to revolve the hydraulic motor 60 at the maximum revolution speed when an electric current supplied to the electromagnetic valve 64 falls down to OA (zero ampere) because of cutting of a harness. In this manner, the cooling fan 61 does not stop even when the supply of the electric current to the electromagnetic valve 64 is stopped, and accordingly the operation fluid and a coolant of the engine 6 can be prevented from being overheated.

The electromagnetic valve 64 disposed on the bypass circuit 63 is also controlled by the control device (the controller) 51 described above. A temperature sensor 65 is connected to the control device 51, the temperature sensor 65 being configured to detect a temperature of the operation fluid (referred to as a fluid temperature). The control device 51 operates the electromagnetic valve 64 in accordance with the fluid temperature detected by the temperature sensor 65, thereby changing a flow rate of the operation fluid supplied to the primary side of the hydraulic motor 60, and thus the cooling fan 61 is revolved at an adequate revolution speed. The temperature sensor 65 may be integrated with the control device 51.

Further, the hydraulic circuit H1 described above and shown in FIG. 1 includes a relief valve 66 between the primary side of the hydraulic motor 60 and the second pump P2. Here, proof pressures of the second pump P2 and the hydraulic motor 60 each are, for example, about 20 MPa, and a relief pressure of the relief valve 66 is, for example, about 15 MPa less than 20 MPa. Thus, the relief valve 66 disposed between the primary side of the hydraulic motor 60 and the second pump P2 is capable of protecting the hydraulic motor 60 and the second pump P2.

Then, an explanation is made about a case where the fluid temperature is very low, for example, a case where the fluid temperature is 0° C. or less, especially a case where the fluid temperature is 10° C. below zero (−10° C.). The low temperature here corresponds to a temperature range where a viscosity of an operation fluid becomes very high, the viscosity being provided in a viscosity grade (a kinetic viscosity) generally used for work machines and where the hydraulic pressure easily rises in the fluid tubes because of the high viscosity, thus applying an extremely high pressure load to the filter 62 after the engine 6 is started up. In the case where a temperature of the operation fluid is low as described above, it is not necessarily required to activate the cooling fan since there is no target to be cooled. Accordingly, it can be considered that the control device 51 fully opens the electromagnetic valve 64 disposed on the bypass circuit 63, thus introducing the operation fluid not to the hydraulic motor 60 but to the bypass circuit.

A state where the electromagnetic valve 64 is fully opened, however, is a state where there is no depressurization means except the relief valve 66 between the second pump P2 and the filter 62. Since a proof pressure of the filter 62 is about 4 MPa to 6 MPa extremely lower than a proof pressure of the relief valve 66, a hydraulic pressure exceeding the proof pressure is applied (raised) in a short time to the filter 62 when the engine 6 is started up at the low temperature, and thus a large load is applied to the filter 62.

The control device 51 of the hydraulic circuit H1 according to the embodiment drives the hydraulic motor 60 of the cooling fan 61 even when a temperature of the operation fluid low. The valve aperture of the electromagnetic valve 64 is controlled without fully opening the electromagnetic valve 64 of the bypass circuit 63, and thus controls, for example, a ratio of a flow rate to the hydraulic motor 60 to a flow rate to the bypass circuit 63 to be from 2 to 8 (2:8) to 4 to 6 (4:6). For example, the electromagnetic valve 64 is closed to about 30% (a valve aperture of the electromagnetic valve 64 is about 30% when a valve aperture of the electromagnetic valve 64 is 100%) in a case where the engine revolution speed is a predetermined value (800 rpm) or more. The electromagnetic valve 64, meanwhile, may be fully closed in a case where the engine revolution speed is a predetermined value (800 rpm) or more.

The operation fluid supplied from the second pump P2 to the hydraulic motor 60 is branched by the driving of the hydraulic motor 60 into the operation fluid flowing to the hydraulic motor 60 and the operation fluid flowing to the bypass circuit 63, and thus a pressure applied to a downstream side being downward further than the hydraulic motor 60 is reduced. In this manner, a hydraulic pressure applied to the filter 62 can be controlled not to exceed the proof pressure of the filter 62.

Figure 2:
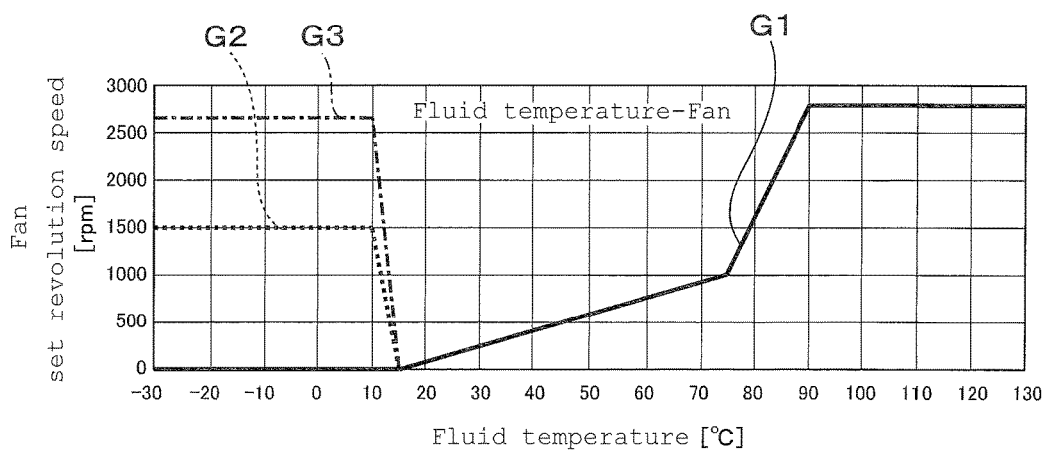
FIG. 2 is a view showing a pattern of a revolution speed control for a cooling fan in the hydraulic circuit according to the embodiment.

Referring to FIG. 2, a control method for the revolution speed of the cooling fan 61 will be explained. FIG. 2 is a view showing a pattern of a revolution speed control for the cooling fan 61 in the hydraulic circuit H1. The pattern G1 shown by a solid line shows a pattern of a fluid temperature following type where the cooling fan 61 is not revolved while the fluid temperature is low and is revolved increasingly in accordance with increasing of the fluid temperature, and patterns G2 and G3 respectively shown by a dotted line and a chain line are examples of patterns according to the embodiment.

When a fluid temperature detected by the temperature sensor 65 is, for example, −10° C. or less, the control device 51 controls the electromagnetic valve 64 to revolve the cooling fan 61 at a predetermined revolution speed such as 1500 revolutions per minute (rpm) immediately after the starting-up of the cranked engine in accordance with the pattern G2 shown by the dotted line in FIG. 2, and thus the control device 51 controls a flow rate to the hydraulic motor 60.

To be detailed, the control device 51 holds the revolution speed of the cooling fan 61 at about 1500 rpm as in the pattern G2 shown by a dotted line immediately after the starting-up of the engine until a fluid temperature rises to some extent. When it is determined that a viscosity of the operation fluid is lowered to reduce a pressure applied to the filter 62 to the proof pressure or less after the fluid temperature rises to a predetermined temperature such as 10° C., the control device 51 reduces the revolution speed of the cooling fan 61 as in the pattern G2 shown by a dotted line, and then switches the control based on the pattern G1 of a fluid temperature following type, the pattern G1 shown by a solid line.

For another example, the control device 51 may hold the revolution speed of the cooling fan 61 at about 2700 rpm as in the pattern G3 shown by a chain line in FIG. 2 immediately after the starting-up of the engine. After that, when it is determined that a viscosity of the operation fluid is lowered to reduce a pressure applied to the filter 62 to the proof pressure or less after the fluid temperature rises, the control device 51 reduces the revolution speed of the cooling fan 61 as in the pattern G3 shown by a chain line, and then switches the control based on the pattern G1 of a fluid temperature following type, the pattern G1 shown by a solid line.

As described above, the revolution speed of the cooling fan 61 can be set to be within a range from about 1500 rpm to about 2700 rpm and around the range immediately after the starting-up of the engine at the low temperature. In addition, the revolution speed of the cooling fan 61 may be held at a constant speed until reaching a revolution speed shown by the pattern G1 of a fluid temperature following type, and then the control may be switched to a control based on the pattern G1 of a fluid temperature following type.

The control device 51 controls a revolution speed of the cooling fan 61 in accordance with a pattern based on a fluid temperature as in the patterns G1 to G3 shown in FIG. 2. However the control device 51 may control the revolution speed of the cooling fan 61 on the basis of not only the fluid temperature but also a passage time from the starting-up of the engine.

In addition, the control device 51 stops supplying an operation fluid to the hydraulic motor 60 to hold the hydraulic motor 60 to be stopped, for example, by fully opening the electromagnetic valve 64 of the bypass circuit 63 during the cranking to start up the engine 6. In this manner, a driving force to crank the engine 6 is not consumed by the hydraulic motor 60, and thus a load can be reduced in the cranking. Meanwhile, the revolution speed of the engine is low, for example, 300 rpm during the cranking to start up the engine 6, and thus a discharge rate of the operation fluid from the second pump P2 is low. Accordingly, hydraulic pressures scarcely rise in the hydraulic tubes s1 and u1 in the cranking movement of the second pump P2. In this manner, a large load is not applied to the filter 62 even when the hydraulic motor 60 is stopped.

The control device 51, meanwhile, opens the electromagnetic valve 64 during the cranking as described above. However, the control device 51 closes the electromagnetic valve 64 when the engine revolution speed reaches a predetermined revolution speed (for example, 500 rpm), and thus increases a flow rate of the operation fluid supplied to the hydraulic motor 60.

According to the work machine having the hydraulic circuit H1 of the embodiment described above, in a case where the engine 6 starts up when a viscosity of the operation fluid is high at a low temperature, a high hydraulic pressure generated between the second pump P2 and the hydraulic motor 60 can be reduced by the relief valve 66, and a hydraulic pressure applied to the filter 62 can be reduced, the filter 62 being disposed on the downstream side being downward further than the hydraulic motor 60.

According to the above-mentioned hydraulic circuit H1 capable of reducing a hydraulic pressure applied to the filter 62, a hose for low pressure can be employed as a hydraulic tube connected to the filter 62 on the downstream side being downward further than the hydraulic motor 60, and thus a cost for manufacturing the hydraulic circuit H1 can be suppressed. In addition, another hydraulic circuit may be constituted, the hydraulic circuit arranging a member such as a low-pressure proof valve in parallel with the filter 62.

That is, according to the work machine having the hydraulic circuit H1 of the embodiment, the hydraulic circuit H1 can be protected without newly including an additional member into the hydraulic circuit H1, the member being configured to reduce a pressured of the operation fluid.

Second Embodiment

Figure 3:
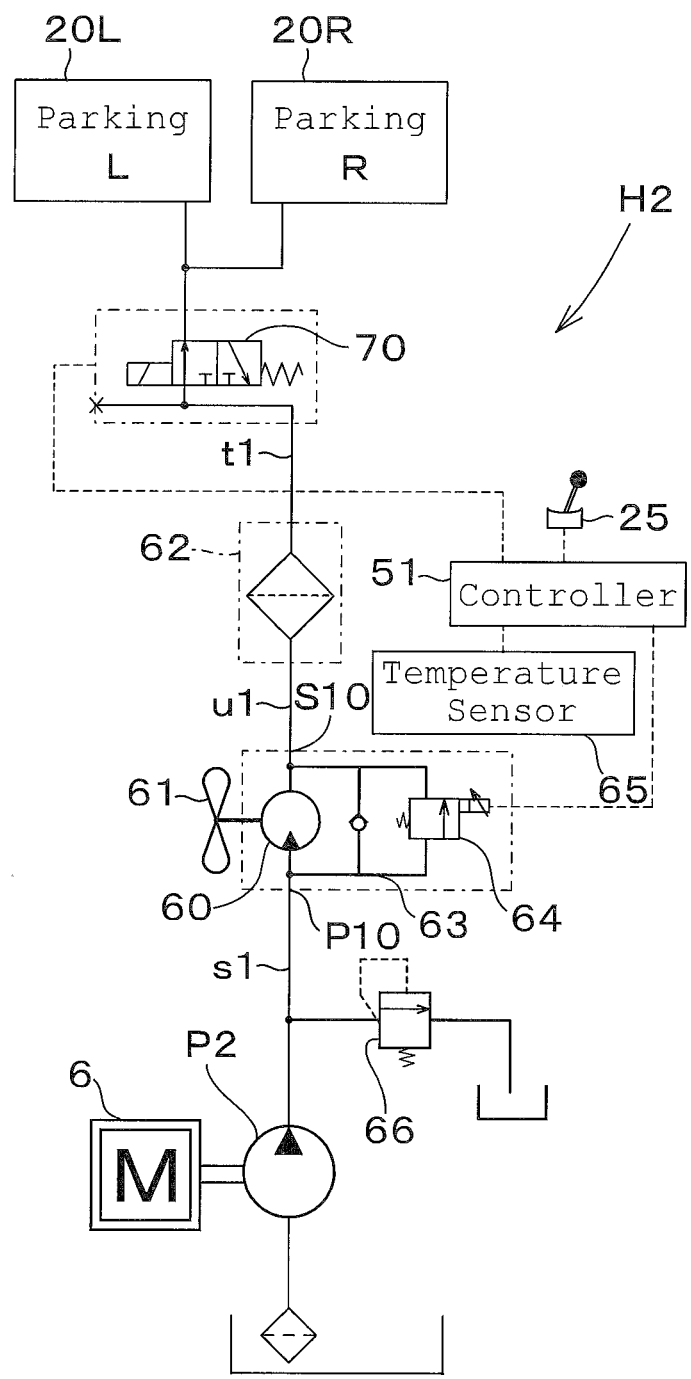
FIG. 3 is a view exemplifying a hydraulic circuit of a work machine according to a second embodiment of the present invention.

Referring to FIG. 3, a second embodiment of the present invention will be explained.

FIG. 3 is a view exemplifying a hydraulic circuit H2 for a travel system of the work machine according to the embodiment, and shows the hydraulic circuit H2 configured to operate a parking mechanism, the parking mechanism being included in a travel motor that is the travel system of the skid steer loader 1.

The hydraulic circuit H2 according to embodiment has a configuration almost same as the configuration from the second pump P2 to the filter 62 along the hydraulic tubes s1 and u1, the configuration being described in the first embodiment. A parking control valve 70 is connected to a downstream side from the filter 62, the parking control valve 70 being configured to activate parking brakes 20L and 20R serving as a parking mechanism for the skid steer loader 1. A pilot pressure (the operation fluid) supplied from the pilot pressure supply fluid tube t1 is applied to the parking brake 20L and the parking brake 20R through the parking control valve 70, the parking brake 20L and the parking brake 20R serving as the parking mechanism. The parking brake 20L and the parking brake 20R each are negative brakes operated by the pilot pressure. The parking brake 20L and the parking brake 20R brake when the parking control valve 70 is closed not to apply the pilot pressure and releases the braking when the parking control valve 70 is opened to apply the pilot pressure. To be detailed, a release signal for releasing the braking is outputted from the controller 51 to the parking control valve 70 when the engine is started up, and thus the parking control valve 70 is opened. A brake signal for the braking is outputted from the controller 51 to the parking control valve 70 when the engine is stopped, and thus the parking control valve 70 is closed.

Also in the work machine having the hydraulic circuit H2 according to the embodiment, especially in the hydraulic circuit 112 requiring the installation of the filter 62, the hydraulic circuit H2 being configured to supply the pilot pressure, the hydraulic motor 60 is driven by the control device 51 in the case where the engine 6 is started up when a viscosity of the operation fluid is high at a low temperature, and thereby a hydraulic pressure applied to the filter 62 is reduced, the filter 62 being disposed on a downstream side being downward further than the hydraulic motor 60. In addition, as in the first embodiment, a high hydraulic pressure generated between the second pump P2 and the hydraulic motor 60 can be reduced by the relief valve 66.

That is, also according to the work machine having the hydraulic circuit H2 of the embodiment, the hydraulic circuit H2 can be protected without newly including an additional member into the hydraulic circuit 112, the member being configured to reduce a pressured of the operation fluid.

Third Embodiment

FIG. 6 shows a plan view of a front portion of the skid steer loader 1.

As shown in FIG. 6, pivot pins 24L and 24R are disposed on the front portions (tip end portions) of the booms 10L and 10R respectively. An attachment device 80 is supported by the pivot pins 24L and 24R.

The attachment device 80 is a device for attachment of the bucket 11 and the auxiliary attachment. The attachment device 80 includes attachment bodies 23L and 23R respectively disposed on the left side and the right side, a lock mechanism 82, and a hitch cylinder 83.

The attachment bodies 23L and 23R are pivotally supported by the pivot pins 24L and 24R, and thus being capable of freely swinging about a lateral axis. The attachment body 23L and the attachment body 23R are connected by the front coupling member 14. In FIG. 6, the bucket 11 is attached to the attachment body 23L and the attachment body 23R. The lock mechanism 82 is a mechanism configured to block (lock) the bucket 11 from being detached from the attachment body 23L and the attachment body 23R. That is, the lock mechanism 82 locks the bucket 11 by latching the bucket 11 on the attachment body 23L and the attachment body 23R.

The hitch cylinder 83 forces the lock mechanism 82 to perform a locking operation and a lock-releasing operation, and is constituted of a double action type hydraulic cylinder. For example, the locking operation is performed by stretching the hitch cylinder 83, and thus the bucket 11 is locked to the attachment body 23L and the attachment body 23R. On the contrary, the lock-releasing operation is performed by shortening the hitch cylinder 83, and thus the locking of the bucket 11 is released from the attachment body 23L and the attachment body 23R. Meanwhile, the attachment and detachment of the bucket 11 are explained in the embodiment. However, the auxiliary attachment also can be attached to and detached from the attachment bodies 23L and 23R as in the bucket 11.

Figure 4:
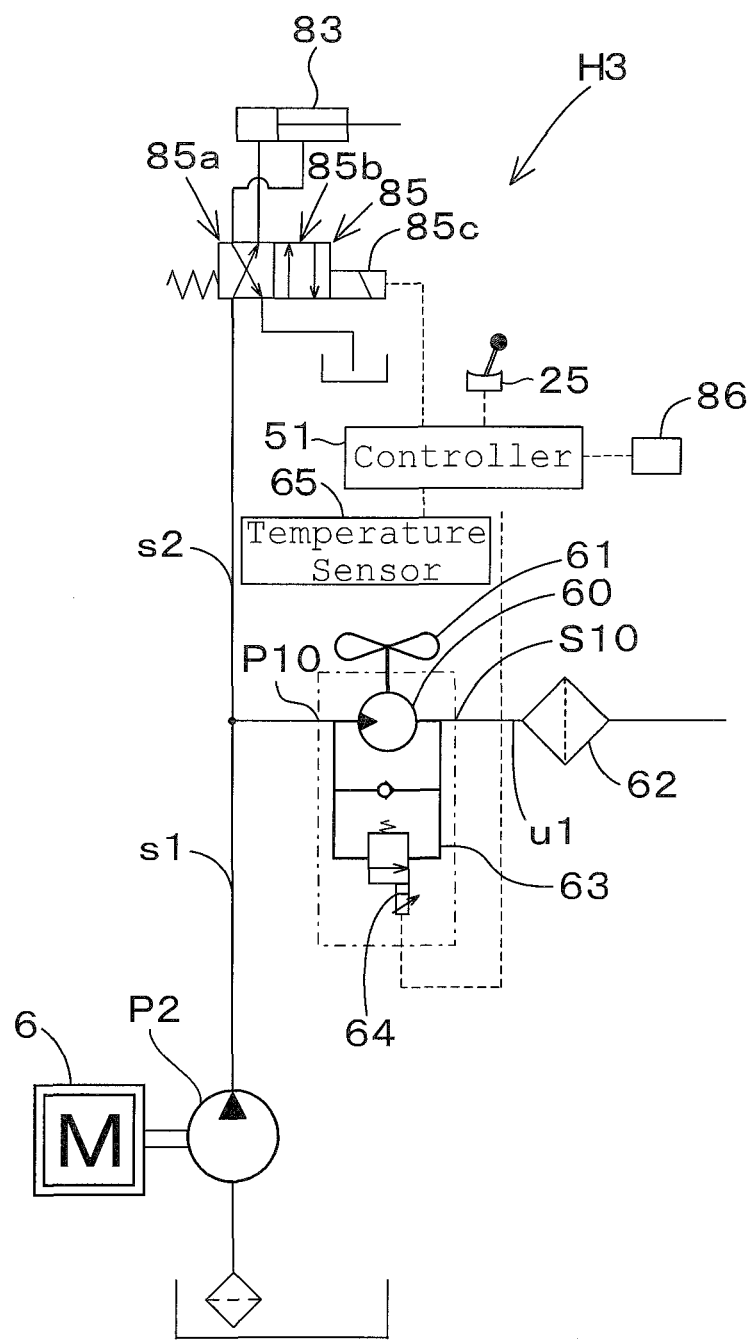
FIG. 4 is a view exemplifying a hydraulic circuit of a work machine according to a third embodiment of the present invention.

FIG. 4 is a view exemplifying a hydraulic circuit H3 for the work machine according to the embodiment. In the following explanation of the hydraulic circuit H3, explanations of configurations same as those of the above-described first embodiment and second embodiment will be omitted.

The hydraulic circuit H3 includes the second pump P2, the hydraulic motor 60, the bypass circuit 63, the electromagnetic valve 64, the hitch cylinder 83, and a control valve (referred to as a hitch control valve) 85.

The second pump P2 and the port P10 of the hydraulic motor 60 are connected to each other by the fluid tube s1 (referred to as a first fluid tube). The fluid tube u1 is connected to the port S10 of the hydraulic motor 60, and the filter 62 is connected to the fluid tube u1. The electromagnetic valve 64 is connected to the bypass circuit 63.

The first fluid tube s1 connecting the second pump P2 and the port P10 of the hydraulic motor 60 to each other is branched toward a downstream side at an intermediate portion. The hitch control valve 85 is connected to a fluid tube s2 (referred to as a second fluid tube) branched toward the downstream. The hitch control valve 85 is a valve for supplying the operation fluid to the hitch cylinder 83 that is a hydraulic actuator, that is, a bi-direction switch valve switched to a first position 85a and to a second position 85b.

The hitch control valve 85 communicates the second fluid tube s2 and a bottom side of the hitch cylinder 83 with each other when switched to the first position 85a. As the result, the operation fluid in the second fluid tube s2 is applied to the bottom side of the hitch cylinder 83, and thus the hitch cylinder 83 moves toward a direction of the stretching. The hitch control valve 85 communicates the second fluid tube s2 and a rod side of the hitch cylinder 83 with each other when switched to the second position 85b. As the result, the operation fluid in the second fluid tube s2 is applied to the rod side of the hitch cylinder 83, and thus the hitch cylinder 83 moves toward a direction of the shortening. That is, the hitch control valve 85 is switched to the first position 85a, and thereby the bucket 11 and the like attached to the attachment bodies 23L and 23R are continuously locked. In addition, the hitch control valve 85 is switched to the second position 85b, and thereby the bucket 11 and the like attached to the attachment bodies 23L and 23R are released from the locking.

The control device (the controller) 51 switches the hitch control valve 85 between the first position 85a and the second position 85b. The control device 51 controls the SP electromagnetic valves 31 and 32 in addition to the hitch control valve 85 and controls the parking control valve 70. The control to the SP electromagnetic valves 31 and 32 and the control of the parking control valve 70 by the control device 51 are the same as the controls of the first embodiment and second embodiment.

The control of the control device 51 will be explained in detail.

An operation tool 86 is connected to the control device 51, the operation tool 86 being configured to operate the hitch cylinder 83 (the hitch control valve 85). The operation tool 86 may be constituted of a lever supported in a freely swingable manner or may be constituted of a switch capable of switched between ON and OFF. A signal for releasing the locking (a release signal) is outputted to the control device 51 when the operation tool 86 is operated. The release signal is not outputted to the control device 51 when the operation tool 86 is not operated.

When the release signal is inputted to the control device 51, the control device 51 magnetizes the solenoid 85c of the hitch control valve 85 and thus switches the hitch control valve 85 to the second position 85b. That is, the control device 51 performs a control of moving the hitch cylinder 83 toward a direction of the shortening, the hitch cylinder 83 being one of hydraulic actuators. In a case where the hitch cylinder 83 is operated, the control device 51 also magnetizes the solenoid of the electromagnetic valve 64 to drive the hydraulic motor 60.

For example, as shown in FIG. 4, the measurement device (the temperature sensor) 65 is connected to the control device 51, the measurement device 65 being configured to measure a temperature. The temperature sensor 65 is a device for measuring a temperature of the operation fluid (a fluid temperature), a temperature of coolant (a water temperature) cooling the engine 6 and the like, a temperature of atmosphere (outside air) around an engine room mounting the engine 6, and the like. In the embodiment, the temperature 65 is a device for measuring the fluid temperature.

In a case where the hitch cylinder 83 is not operated (in a case where the release signal is not inputted), the control device 51 controls the revolution speed of the hydraulic motor 60 on the basis of the fluid temperature measured by the temperature sensor 65. For example, when the fluid temperature is 15° C. or more under a state where the hitch cylinder 83 is not operated, the control device 51 sets the revolution speed of the hydraulic motor 60 on the basis of an increasing fluid temperature as shown by the pattern G1 in FIG. 2, and increases the revolution speed of the hydraulic motor 60 in accordance with a set value already set.

In the case where the hitch cylinder 83 is operated (the case where the release signal is inputted), the control device 51 increases a revolution speed of the hydraulic motor 60. Specifically, in the case where the hitch cylinder 83 is operated, the control device 51 sets the revolution speed of the hydraulic motor 60 to a revolution speed higher than a set value to be set based on a fluid temperature. For example, in a case where a fluid temperature is less than 15° C. under a state where the hitch cylinder 83 is operated, the control device 51 increases a revolution speed of the hydraulic motor 60 as shown by the patterns G2 and G3 in FIG. 2 regardless of the fluid temperature measured by the temperature sensor 65. That is, the control device 51 also magnetizes the solenoid of the electromagnetic valve 64 under a state where the hitch cylinder 83 is operated, and thus drives the hydraulic motor 60. That is, the control device 51 increases the revolution speed of the hydraulic motor 60 in a case where the bucket 11 and the like is detached by shortening the hitch cylinder 83.

In this manner, a pressure applied to the port P10 of the hydraulic motor 60 is higher than a pressure under a state where the electromagnetic valve 64 is fully opened (a state where the hydraulic motor 60 is stopped or revolved at a low speed). That is, a pressure of the operation fluid (the pilot pressure) applied to the second fluid tube s2 branched from the first fluid tube s1 also becomes high. In this manner, the pressure of the operation fluid (the pilot pressure) applied to the hitch control valve 85 and the hitch cylinder 83 is increased, and thus the hitch cylinder 83 can be shortened instantly. That is, the hydraulic motor 60 is revolved during the operation of the hitch cylinder 83, and thus an operation speed of the hitch cylinder 83 can be increased.

Meanwhile, in a case where a temperature of the operation fluid is low during the operation of the hitch cylinder 83, the more the temperature is low, the more the control device 51 enlarges an increment range of a revolution speed of the hydraulic motor 60. That is, in the case where a fluid temperature is low, the more the fluid temperature is high, the more the control device 51 enlarges the increment range of the revolution speed of the hydraulic motor 60 in accordance with the lowness of the fluid temperature. For example, in a case where a fluid temperature detected by the temperature sensor 65 is −10° C. when the hitch cylinder 83 is operated, the increment range of increasing a revolution speed of the hydraulic motor 60 is enlarged than the increment range of a case where the fluid temperature is −5° C.

In this manner, a hydraulic actuator such as the hitch cylinder 83 tends to move slowly under a state where a viscosity of the operation fluid is very high because a temperature of the operation fluid is low. However, in the embodiment, a revolution speed of the hydraulic motor 60 is purposely increased to increase a pressure applied to the second fluid tube s2. Thus, the hitch cylinder 83 can be moved fast even when a temperature of the operation fluid is low.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

For example, the embodiments described above disclose the SP electromagnetic valves 31 and 32 and the SP control valve 30 as a circuit configuration on a downstream side being downward further than the filter 62, the SP control valve 30 being configured to be driven by the SP electromagnetic valves 31 and 32 and to drive the auxiliary actuator 33, and then discloses the parking control valve 70 and the parking brakes 20L and 20R, the parking brakes 20L and 20R being configured to be driven by the parking control valve 70. The circuit configuration on a downstream side being downward further than the filter 62, however, is not limited to a configuration disclosed in the embodiments described above, and thus various configurations may be employed other than the configurations disclosed in the embodiments described above since CTLs and SSLs may include a circuit configuration for driving a hitch cylinder on a downstream side being downward further than the filter 62.

In the embodiments described above, the hydraulic motor 60 is stopped under a state where the electromagnetic valve 64 is fully opened. However, the embodiments may employ a configuration allowing the hydraulic motor 60 to slightly revolve even when the electromagnetic valve 64 is fully opened, that is, a configuration allowing the hydraulic motor 60 to revolve at a low speed even when the electromagnetic valve 64 is fully opened. In the embodiments described above, the hydraulic motor 60 is stopped during the cranking of the engine. However, the hydraulic motor 60 may be held at the minimum speed, for example, by fully closing electromagnetic valve 64.

Figure 5A:
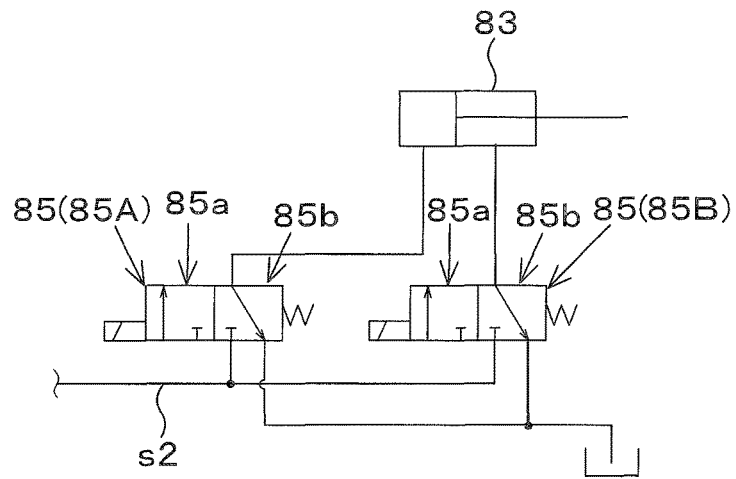
FIG. 5A is a view showing a modified example of a hitch cylinder according to the third embodiment.

In the embodiments described above, the hitch cylinder 83 is controlled by the single hitch control valve 85. However, the hitch cylinder 83 may be controlled by the plurality of the hitch control valves 85 as shown in FIG. 5A. The plurality of hitch control valves 85 include a first hitch control valve 85A and a second hitch control valve 85B, the first hitch control valve 85A being connected to a bottom side of the hitch cylinder 83, the second hitch control valve 85B being connected to a rod side of the hitch cylinder 83. The first hitch control valve 85A and the second hitch control valve 85B each can be switched to each of the first position 85a and the second position 85b.

In a case where the first hitch control valve 85A is at the second position 85b, a communication between the second fluid tube s2 and the bottom side of the hitch cylinder 83 is blocked. At that moment, the second hitch control valve 85B communicates the second fluid tube s2 and the rod side of the hitch cylinder 83 with each other by being at the first position 85a. In this manner, the hitch cylinder 83 moves toward a direction of the shortening, and thus the bucket 11 and the like attached to the attachment bodies 23L and 23R can be held to be locked. In addition, in a case where the first hitch control valve 85A is at the first position 85a, the second fluid tube s2 and the bottom side of the hitch cylinder 83 are communicated with each other. At that moment, the second hitch control valve 85B blocks a communication between the second fluid tube s2 and the rod side of the hitch cylinder 83 is blocked by being at the second position 85b. In this manner, the hitch cylinder 83 moves toward a direction of the stretching, and thus the bucket 11 and the like attached to the attachment bodies 23L and 23R can be released from being locked.

Figure 5B:
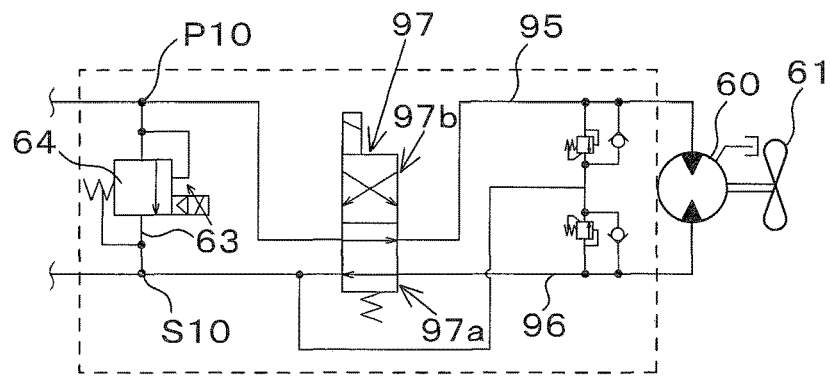
FIG. 5B is a view showing a first modified example of a hydraulic motor according to the third embodiment.

In the embodiments described above, the hydraulic motor 60 is a motor configured to revolve in one direction. However, the hydraulic motor 60 may be a motor configured to revolve in one direction (a forward revolution) and in the other direction (a backward revolution) as shown in FIG. 5B. A first main fluid tube 95 and a second main fluid tube 96 are connected to the hydraulic motor 60, the first main fluid tube 95 passing through the port P10 serving as the primary side of the hydraulic motor 60, the second main fluid tube 96 passing through the port S10 serving as the secondary side of the hydraulic motor 60. In addition, the bypass circuit 63 is connected between the first main fluid tube 95 and the second main fluid tube 96. The electromagnetic valve 64 is connected to the bypass circuit 63. A switch valve 97 is connected to the first main fluid tube 95 and the second main fluid tube 96, the switch valve 97 being configured to change a direction of the operation fluid. The switch valve 97 is capable of being switched to a first position 97a and to a second position 97b. The hydraulic motor 60 revolves forward when the switch valve 97 is at the first position 97a. The hydraulic motor 60 revolves backward when the switch valve 97 is at the second position 97b.

Figure 5C:
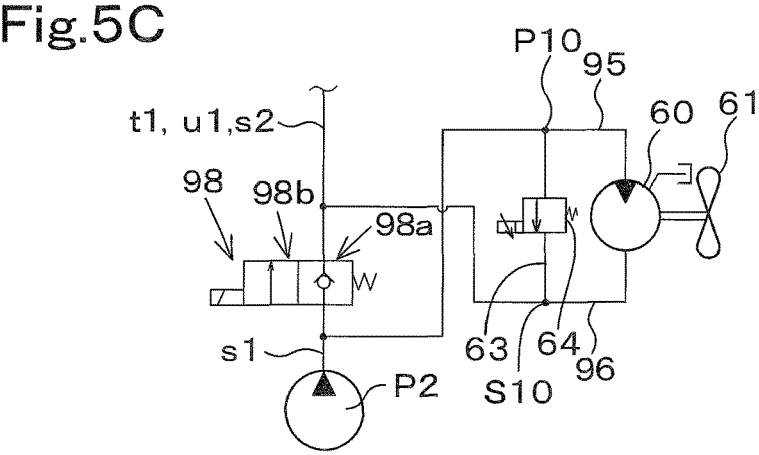
FIG. 5C is a view showing a second modified example of the hydraulic motor according to the third embodiment.

In addition, the hydraulic circuit connected to the hydraulic motor 60 may be a circuit shown in FIG. 5C. In that case, the first main fluid tube 95 and the second main fluid tube 96 are connected to the hydraulic motor 60 as shown in FIG. 5C, the first main fluid tube 95 passing through the port P10 serving as the primary side of the hydraulic motor 60, the second main fluid tube 96 passing through the port S10 serving as the secondary side of the hydraulic motor 60. In addition, the bypass circuit 63 is connected between the first main fluid tube 95 and the second main fluid tube 96. The electromagnetic valve 64 is connected to the bypass circuit 63. The first fluid tube s1 is connected to the first main fluid tube 95, and the pilot pressure supply fluid tube t1 is connected to the second main fluid tube 96. A switch valve 98 is connected between the first fluid tube s1 and the pilot pressure supply fluid tube t1.

The switch valve 98 is capable of being switched to a first position 98a and to a second position 98b. When the switch valve 98 is at the first position 98a, the switch valve 98 prevents the operation fluid from directly flowing from the first fluid tube s1 to the pilot pressure supply fluid tube t1, the operation fluid being discharged from the second pump P2. That is, when the switch valve 98 is at the first position 98a, the operation fluid passes through the hydraulic motor 60 or the electromagnetic valve 64 and flows toward the pilot pressure supply fluid tube t1.

When the switch valve 98 is at the second position 98b, the switch valve 98 allows the operation fluid to directly flow from the first fluid tube s1 to the pilot pressure supply fluid tube t1, the operation fluid being discharged from the second pump P2.

Meanwhile, the switching between the first position and the second position in the switch valves 97 and 98 is carried out based on a control signal outputted from the control device (the controller) 51. In addition, the fluid tube u1 or the second fluid tube s2 may be connected to the second main fluid tube 96 and the switch valve 98 instead of the pilot pressure supply fluid tube t1.

Obviously, numerous modifications and variations of the present invention are possible in light of the above teachings. It is therefore to be understood that within the scope of the appended claims, the invention may be practiced otherwise than as specifically described herein.

What is claimed is:

1. A work machine comprising:
an engine;
a hydraulic motor having a primary side and a secondary side;
a cooling fan to be revolved by the hydraulic motor;
a hydraulic pump to be driven by the engine to supply an operation fluid to the primary side of the hydraulic motor;
a bypass circuit to connect the primary side and the secondary side of the hydraulic motor;
an electromagnetic valve disposed in the bypass circuit, the electromagnetic valve being configured to control a flowing amount of the operation fluid in the bypass circuit to control an amount of the operation fluid supplied to the primary side of the hydraulic motor;
a filter disposed on a fluid tube connected to the secondary side of the hydraulic motor;
a relief valve disposed between the hydraulic pump and the primary side of the hydraulic motor; and
a controller to control the electromagnetic valve to drive the hydraulic motor in a case where a temperature of the operation fluid is low when the engine is started.

2. The work machine according to claim 1, wherein
the controller controls the electromagnetic valve to drive the hydraulic motor after the engine is cranked in the case where the temperature of the operation fluid is low.

3. The work machine according to claim 1, wherein
the controller holds a revolution speed of the hydraulic motor at a minimum speed including a stopped speed while the engine is cranked.

4. The work machine according to claim 1, comprising:
a hydraulic actuator;
a control valve to supply the operation fluid to the hydraulic actuator; and
a pilot control valve to supply a pilot pressure to the control valve, wherein
the filter is disposed between the pilot control valve and the hydraulic motor.

5. The work machine according to claim 1, comprising
a parking control valve to supply the operation fluid, wherein
the filter is disposed between the parking control valve and the hydraulic motor.

6. A work machine comprising:
an engine;
a hydraulic motor having a primary side and a secondary side;
a cooling fan to be revolved by the hydraulic motor;
a hydraulic pump to be driven by the engine to supply an operation fluid to the primary side of the hydraulic motor;
a bypass circuit to connect the primary side and the secondary side of the hydraulic motor;
an electromagnetic valve disposed in the bypass circuit, the electromagnetic valve being configured to control a flowing amount of the operation fluid in the bypass circuit to control an amount of the operation fluid supplied to the primary side of the hydraulic motor;
a first fluid tube to connect the primary side of the hydraulic motor and the hydraulic pump;
a second fluid tube branched from the first fluid tube;
a hydraulic actuator to receive the operation fluid from the second fluid tube;
a control valve connected to the second fluid tube to supply the operation fluid to the hydraulic actuator; and
a controller to control the electromagnetic valve to increase a revolution speed of the hydraulic motor when the hydraulic actuator is in operation.

7. The work machine according to claim 6, comprising
a temperature sensor to measure a temperature, wherein
the controller controls the revolution speed of the hydraulic motor to reach a first speed determined based on a temperature measured by the temperature sensor when the hydraulic actuator is not in operation, and
the controller increases the revolution speed of the hydraulic motor to reach a second speed larger than the first speed when the hydraulic actuator is in operation.

8. The work machine according to claim 7, wherein
the controller sets an increment range of the revolution speed of the hydraulic motor larger as the temperature measured by the temperature sensor becomes lower when the temperature measured by the temperature sensor is low.

9. The work machine according to claim 6, wherein
the hydraulic actuator is a hitch cylinder.

* * * * *